(12) United States Patent
Ohlsson et al.

(10) Patent No.: US 11,917,518 B2
(45) Date of Patent: Feb. 27, 2024

(54) HANDLING OF EMERGENCY SERVICES FOR NON-PUBLIC NETWORKS

(71) Applicant: Telefonaktiebolaget LM Ericsson (publ), Stockholm (SE)

(72) Inventors: Oscar Ohlsson, Bromma (SE); Shabnam Sultana, Montreal (CA); Peter Hedman, Helsingborg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 180 days.

(21) Appl. No.: 17/442,218

(22) PCT Filed: Apr. 2, 2020

(86) PCT No.: PCT/IB2020/053175
§ 371 (c)(1),
(2) Date: Sep. 23, 2021

(87) PCT Pub. No.: WO2020/202078
PCT Pub. Date: Oct. 8, 2020

(65) Prior Publication Data
US 2022/0174464 A1    Jun. 2, 2022

Related U.S. Application Data

(60) Provisional application No. 62/828,173, filed on Apr. 2, 2019.

(51) Int. Cl.
*H04W 4/90* (2018.01)
*H04L 65/1016* (2022.01)
*H04W 48/18* (2009.01)

(52) U.S. Cl.
CPC ........... *H04W 4/90* (2018.02); *H04L 65/1016* (2013.01); *H04W 48/18* (2013.01)

(58) Field of Classification Search
CPC ...... H04W 4/90; H04W 48/18; H04L 65/1016
See application file for complete search history.

(56) References Cited

U.S. PATENT DOCUMENTS

| | | | |
|---|---|---|---|
| 2012/0264428 A1 | 10/2012 | Lecompte | |
| 2021/0029776 A1* | 1/2021 | Tiwari | H04L 65/1073 |
| 2021/0184875 A1* | 6/2021 | Qiao | H04M 15/66 |

FOREIGN PATENT DOCUMENTS

| | | |
|---|---|---|
| CN | 108401275 A | 8/2018 |
| WO | 2018/231813 A4 | 12/2018 |

OTHER PUBLICATIONS

3GPP TS 23502 V16.0.0 (Mar. 2019) 3rd Generation Partnership Project; Technical Specification Group Services and System Aspects; Procedures for the 5G System; Stage 2 (Release 16), consisting of 420 pages.

(Continued)

*Primary Examiner* — Wayne H Cai
(74) *Attorney, Agent, or Firm* — Christopher & Weisberg, P.A.

(57) ABSTRACT

A method, system and apparatus are disclosed. In some embodiments, a network node configured to communicate with a wireless device (WD) is provided. The network node is configured to indicate, in a System Information Block (SIB) whether a network supports an Internet Protocol (IP) Multimedia Subsystem (IMS) emergency communication service, the indication associated to a network identifier, the network identifier identifying the network. In some embodiments, a wireless device is configured to receive, in a SIB, an indication of whether a network supports an IMS emergency communication service, the indication associated to a network identifier, the network identifier identifying the network; and select a network to initiate an emergency communication service based at least in part on the received indication.

6 Claims, 10 Drawing Sheets

(56) References Cited

OTHER PUBLICATIONS

Invitation to Pay Additional Fees and, Where Applicable, Protest Fee dated Jun. 15, 2020 issued in PCT Application No. PCT/IB2020/053175, consisting of 15 pages.
International Search Report and Written opinion dated Aug. 25, 2020 issued in PCT Application No. PCT/IB2020/053175, consisting of 23 pages.
Written Opinion of the International Preliminary Examining Authority dated May 26, 2021 issued in PCT Application No. PCT/IB2020/053175, consisting of 11 pages.
Notification of Transmittal of the International Preliminary Report on Patentability dated Jul. 8, 2021 issued in PCT Application No. PCT/IB2020/053175, consisting of 61 pages.
3GPP TS 23.167 V14.4.0 (Dec. 2018) 3rd Generation Partnership Project; Technical Specification Group Services and System Aspects; IP Multimedia Subsystem (IMS) Emergency Sessions (Release 15), consisting of 64 pages.
3GPP TS 23.502 V16.4.0 (Mar. 2019) 3rd Generation Partnership Project; Technical Specification Group Services and System Aspects; Procedures for the 5G System; Stage 2 (Release 16), consisting of 420 pages.
3GPP TS 36.300 V15.3.0 (Sep. 2018) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 15), consisting of 358 pages.
3GPP TS 36.331 V15.4.0 (Dec. 2018) 3rd Generation Partnership Project; Technical Specification Group Radio Access Network; Evolved Universal Terrestrial Radio Access (E-UTRA); Radio Resource Control (RRC); Protocol Specification (Release 15), consisting of 933 pages.
3GPP TS 38.300 V15.3.1 (Oct. 2018) 3rd Generation Partnership Project; Technical Specification Group Radio Access Network; NR; NR and NG-RAN Overall Description; Stage 2 (Release 15), consisting of 92 pages.
3GPP TSG-RAN WG2 Meeting #68bis; Valencia, Spain, Jan. 18-22, 2010; R2-100307; Source: NEC; Title: K_ASME Mismatch at IMS Emergency Call Establishment; Agenda Item: 6.2; Document for: Discussion and Decision, consisting of 1 page.
Bgpp Tsg-Sa WG2 Meeting #131; Tenerife, Spain, Feb. 25 - Mar. 1, 2019; S2-1901613; Change Request - 23.501, Current Version: 15.4.0; Source: OPPO; consisting of 7 pages.
SA WG2 Meeting #131; Feb. 25-Mar. 1, 2019, Santa Cruz, Tenerife; S2-1901953; Source: Samsung; Title: Update on Standalone NPN Description; Document for: Approval; Agenda Item: 6.15.3; Work Item/Release: Re-16, consisting of 3 pages.

* cited by examiner

HANDLING OF EMERGENCY SERVICES FOR NON-PUBLIC NETWORKS

CROSS-REFERENCE TO RELATED APPLICATIONS

This application is a Submission Under 35 U.S.C. § 371 for U.S. National Stage Patent Application of International Application No.: PCT/IB2020/053175, filed Apr. 2, 2020 entitled "HANDLING FOR EMERGENCY SERVICES FOR NON-PUBLIC NETWORKS," which claims priority to U.S. Provisional Application No. 62/828,173, filed Apr. 2, 2019, entitled "HANDLING OF EMERGENCY SERVICES FOR NON-PUBLIC NETWORKS," the entireties of both of which are incorporated herein by reference.

TECHNICAL FIELD

The present disclosure relates to wireless communications, and in particular, to indicating to and/or directing a wireless device to a network that supports emergency services.

BACKGROUND

Support for non-public networks (NPNs) is currently being considered. FIG. 1 illustrates examples of NPNs. The left side of FIG. 1 illustrates an example of a non-public network (NPN) deployed standalone (SNPN). When an NPN is SNPN, then in Third Generation Partnership Project (3GPP) Release (Rel)-16 it may be assumed that the NPN may not support emergency services (i.e., public emergency Internet Protocol (IP) Multimedia Subsystem (IMS)/voice service).

The right side of FIG. 1 illustrates an example of an NPN deployed together or integrated with the public land mobile network (PLMN) in some level of integration, also referred to as Public Network Integrated NPN (PNI NPN). There may be a different level of integration of the NPN in (or with) the public network, e.g.:
1. The session management function (SMF) and/or user plane function (UPF) may be dedicated to NPN (i.e., Access Management Function (AMF) is common between NPN and PLMN);
2. The AMF and SMF/UPF may be dedicated to NPN; or
3. Only the Next Generation-Radio Access Network (NG-RAN) may be shared with the public network.

The wireless device is assumed to have a subscription for PLMN.

The current radio resource control (RRC) system information block (SIB)1 (System Information) supports an indication "ims-EmergencySupport" which indicates, for the cell, whether there is support for IP multimedia core network subsystem (IMS) emergency services.

The current emergency fallback procedure supports emergency fallback from a 3GPP 5$^{th}$ Generation System (5GS) to Evolved Packet System (EPS), and Radio Access Technology (RAT) fallback from 3GPP New Radio (NR) to Evolved Universal Terrestrial Radio Access (E-UTRA) connected to 3GPP 5$^{th}$ Generation Core (5GC).

However, existing 3GPP Rel-16 emergency services are not supported in Non-Public Networks (NPN) which are standalone (SNPN). When the NPN is deployed in some way with public networks (PLMN) which support emergency services, the support for emergency services may be enabled for the wireless device via the PLMN.

There are different deployment cases, e.g., in some cases, there is no signaling connection between the PLMN and NPN, e.g., they may only use a common shared RAN. In other cases, there is a signaling possibility between the networks, e.g., NPN could redirect the wireless device 22 to the PLMN when the wireless device 22 determines to perform emergency calls.

When a RAN is shared in existing systems, the RAN is for PLMNs and they are assumed to have the same support for emergency services. Further, there are problems having wireless devices configured to select a network supporting emergency services.

SUMMARY

Some embodiments of this disclosure relate to how wireless device logic may be enhanced to help ensure that the wireless device is redirected to or selects a network supporting emergency services.

Some embodiments advantageously provide methods, systems, and apparatuses for indicating to and/or directing a wireless device to a network that supports emergency services.

In some embodiments, different logic can be applied, by the wireless device or by the network node or both, to help ensure the wireless device is directed to the network, PLMN, supporting emergency services.

According to an aspect of the present disclosure, a method implemented in a network node is provided. The method includes indicating, in a System Information Block, SIB, whether a network supports an Internet Protocol, IP, Multimedia Subsystem, IMS, emergency communication service, the indication associated to a network identifier, the network identifier identifying the network.

In some embodiments, the indication is comprised in an ims-EmergencySupport SIB parameter. In some embodiments, the indication of whether the network supports the IMS emergency communication service is associated to a public land mobile network, PLMN, identity, ID. In some embodiments, the indication is further associated to a PLMN ID extension. In some embodiments, the PLMN ID extension is a network identity, NID, and a combination of the PLMN ID and the NID identifies a standalone non-public network, SNPN, to which the indication of whether the network supports the IMS emergency communication service is associated to. In some embodiments, the PLMN ID extension is a closed access group, CAG, identity, ID, and a combination of the PLMN ID and the CAG ID identifies a public network integrated, PNI, non-public network, NPN, to which the indication of whether the network supports the IMS emergency communication service is associated to.

According to an aspect of the present disclosure, a method implemented in a wireless device is provided. The method includes receiving, in a System Information Block, SIB, an indication of whether a network supports an Internet Protocol, IP, Multimedia Subsystem, IMS, emergency communication service, the indication associated to a network identifier, the network identifier identifying the network. The method includes selecting a network to initiate an emergency communication service based at least in part on the received indication.

In some embodiments, the indication is comprised in an ims-EmergencySupport SIB parameter. In some embodiments, the indication of whether the network supports the IMS emergency communication service is associated to a public land mobile network, PLMN, identity, ID. In some embodiments, the indication is further associated to a PLMN ID extension. In some embodiments, the PLMN ID extension is a network identity, NID, and a combination of the PLMN ID and the NID identifies a standalone non-public network, SNPN, to which the indication of whether the network supports the IMS emergency communication service is associated to. In some embodiments, the PLMN ID extension is a closed access group, CAG, identity, ID, and a combination of the PLMN ID and the CAG ID identifies a public network integrated, PNI, non-public network, NPN, to which the indication of whether the network supports the IMS emergency communication service is associated to.

According to an aspect of the present disclosure, a network node configured to communicate with a wireless device is provided. The network node includes processing circuitry. The processing circuitry is configured to cause the network node to indicate, in a System Information Block, SIB, whether a network supports an Internet Protocol, IP, Multimedia Subsystem, IMS, emergency communication service, the indication associated to a network identifier, the network identifier identifying the network.

In some embodiments, the indication is comprised in an ims-EmergencySupport SIB parameter. In some embodiments, the indication of whether the network supports the IMS emergency communication service is associated to a public land mobile network, PLMN, identity, ID. In some embodiments, the indication is further associated to a PLMN ID extension. In some embodiments, the PLMN ID extension is a network identity, NID, and a combination of the PLMN ID and the NID identifies a standalone non-public network, SNPN, to which the indication of whether the network supports the IMS emergency communication service is associated to. In some embodiments, the PLMN ID extension is a closed access group, CAG, identity, ID, and a combination of the PLMN ID and the CAG ID identifies a public network integrated, PNI, non-public network, NPN, to which the indication of whether the network supports the IMS emergency communication service is associated to.

According to yet another aspect of the present disclosure, a wireless device configured to communicate with a network node is provided. The wireless device includes processing circuitry. The processing circuitry is configured to cause the wireless device to receive, in a System Information Block, SIB, an indication of whether a network supports an Internet Protocol, IP, Multimedia Subsystem, IMS, emergency communication service, the indication associated to a network identifier, the network identifier identifying the network. The processing circuitry is configured to cause the wireless device to select a network to initiate an emergency communication service based at least in part on the received indication.

In some embodiments, the indication is comprised in an ims-EmergencySupport SIB parameter. In some embodiments, the indication of whether the network supports the IMS emergency communication service is associated to a public land mobile network, PLMN, identity, ID. In some embodiments, the indication is further associated to a PLMN ID extension. In some embodiments, the PLMN ID extension is a network identity, NID, and a combination of the PLMN ID and the NID identifies a standalone non-public network, SNPN, to which the indication of whether the network supports the IMS emergency communication service is associated to. In some embodiments, the PLMN ID extension is a closed access group, CAG, identity, ID, and a combination of the PLMN ID and the CAG ID identifies a public network integrated, PNI, non-public network, NPN, to which the indication of whether the network supports the IMS emergency communication service is associated to.

According to an aspect of the present disclosure, a method implemented in a network node comprising an Access Management Function, AMF, is provided. The method includes during at least one of a radio access network, RAN, setup and configuration, indicating whether the network node comprising the AMF supports emergency services.

According to another aspect of the present disclosure, a network node comprising an Access Management Function, AMF, is provided. The network node includes processing circuitry. The processing circuitry is configured cause the network node to during at least one of a radio access network, RAN, setup and configuration, indicate whether the network node comprising the AMF supports emergency services.

According to another aspect of the present disclosure, a method implemented in a network node is provided. The method includes requesting an emergency services fallback, the request including an indication of a network node supporting emergency services if a wireless device requests emergency services, the indication including at least one of a target Access Management Function, AMF, address and a target public land mobile network, PLMN, identity, ID.

According to yet another aspect of the present disclosure, a network node including processing circuitry is provided. The processing circuitry is configured cause the network node to request an emergency services fallback, the request including an indication of a network node supporting emergency services if a wireless device requests emergency services, the indication including at least one of a target Access Management Function, AMF, address and a target public land mobile network, PLMN, identity, ID.

According to yet another aspect of the present disclosure, a method implemented in a network node configured to communicate with a wireless device is provided. The method includes, as a result of receiving a request for an emergency services fallback, sending, to the wireless device, a radio resource control, RRC, release with redirect message including a public land mobile network, PLMN, identity, ID.

According to another aspect of the present disclosure, a network node configured to communicate with a wireless device is provided. The network node includes processing circuitry. The processing circuitry is configured to cause the network node to, as a result of receiving a request for an emergency services fallback, send, to the wireless device, a radio resource control, RRC, release with redirect message including a public land mobile network, PLMN, identity, ID.

According to another aspect of the present disclosure, a method implemented in a wireless device configured to communicate with a network node is provided. The method includes sending a request for an emergency service. The method includes, as a result of the request for the emergency service, receiving a radio resource control, RRC, release with redirect message including a public land mobile network, PLMN, identity, ID. The method includes using the PLMN ID to indicate a selected PLMN for an RRC establishment.

According to another aspect of the present disclosure, a wireless device configured to communicate with a network node is provided. The wireless device includes processing circuitry. The processing circuitry is configured to cause the wireless device to send a request for an emergency service. The processing circuitry is configured to cause the wireless device to, as a result of the request for the emergency service, receive a radio resource control, RRC, release with redirect message including a public land mobile network, PLMN, identity, ID. The processing circuitry is configured to cause the wireless device to use the PLMN ID to indicate a selected PLMN for an RRC establishment.

According to yet another aspect of the present disclosure, a method implemented in a wireless device configured to communicate with a network node is provided. The method includes requesting, to the network node, an emergency service by indicating an emergency as one of a radio resource control, RRC, establishment cause and an RRC resume cause.

According to another aspect of the present disclosure, a wireless device configured to communicate with a network node is provided. The wireless device includes processing circuitry. The processing circuitry is configured to cause the wireless device to request, from the network node, an emergency service by indicating an emergency as one of a radio resource control, RRC, establishment cause and an RRC resume cause.

According to yet another aspect of the present disclosure, a method implemented in a network node comprising an Access Management Function, AMF, is provided. The method includes, as a result of receiving a request for an emergency services fallback, performing a registration with AMF re-allocation procedure.

In some embodiments, performing the registration with AMF re-allocation procedure further includes performing the registration with AMF re-allocation procedure toward a target AMF, the target AMF being configured to support the request for the emergency services fallback.

According to yet another aspect, a network node comprising an Access Management Function, AMF, is provided. The network node includes processing circuitry. The processing circuitry is configured cause the network node to, as a result of receiving a request for an emergency services fallback, perform a registration with AMF re-allocation procedure.

In some embodiments, the processing circuitry is configured to perform the registration with AMF re-allocation procedure by being configured to cause the network node to perform the registration with AMF re-allocation procedure toward a target AMF, the target AMF being configured to support the request for the emergency services fallback.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
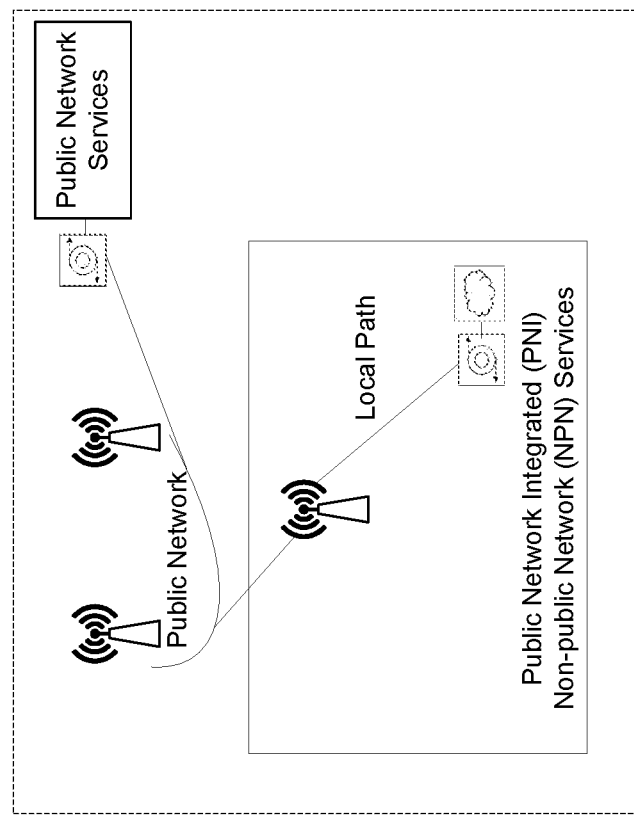
FIG. 1 is a diagram of deployment scenarios.
Figure 1:
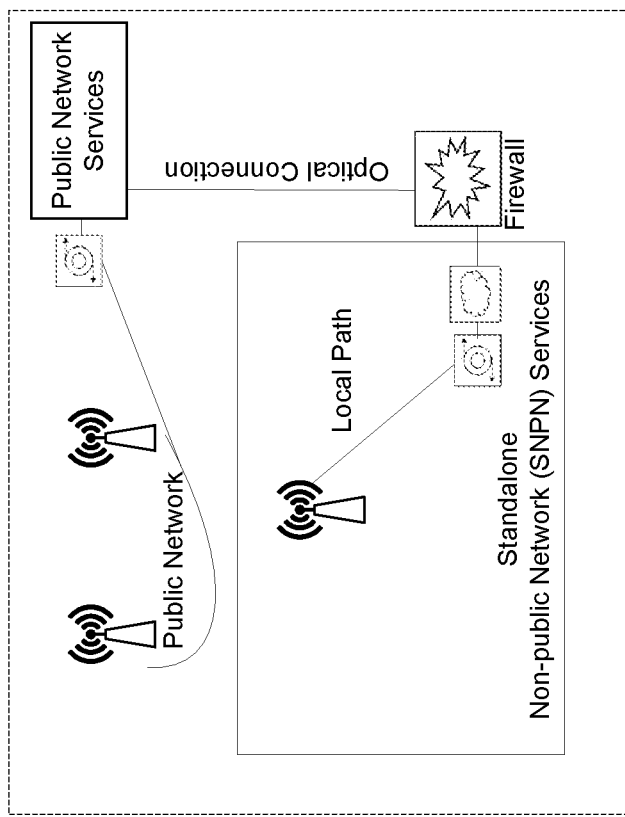

Before describing in detail exemplary embodiments, it is noted that the embodiments reside primarily in combinations of apparatus components and processing steps related to indicating to and/or directing a wireless device to a network that supports emergency services. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), access management function (AMF) node, self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide indicating to and/or directing a wireless device to a network that supports emergency services.

Figure 2:
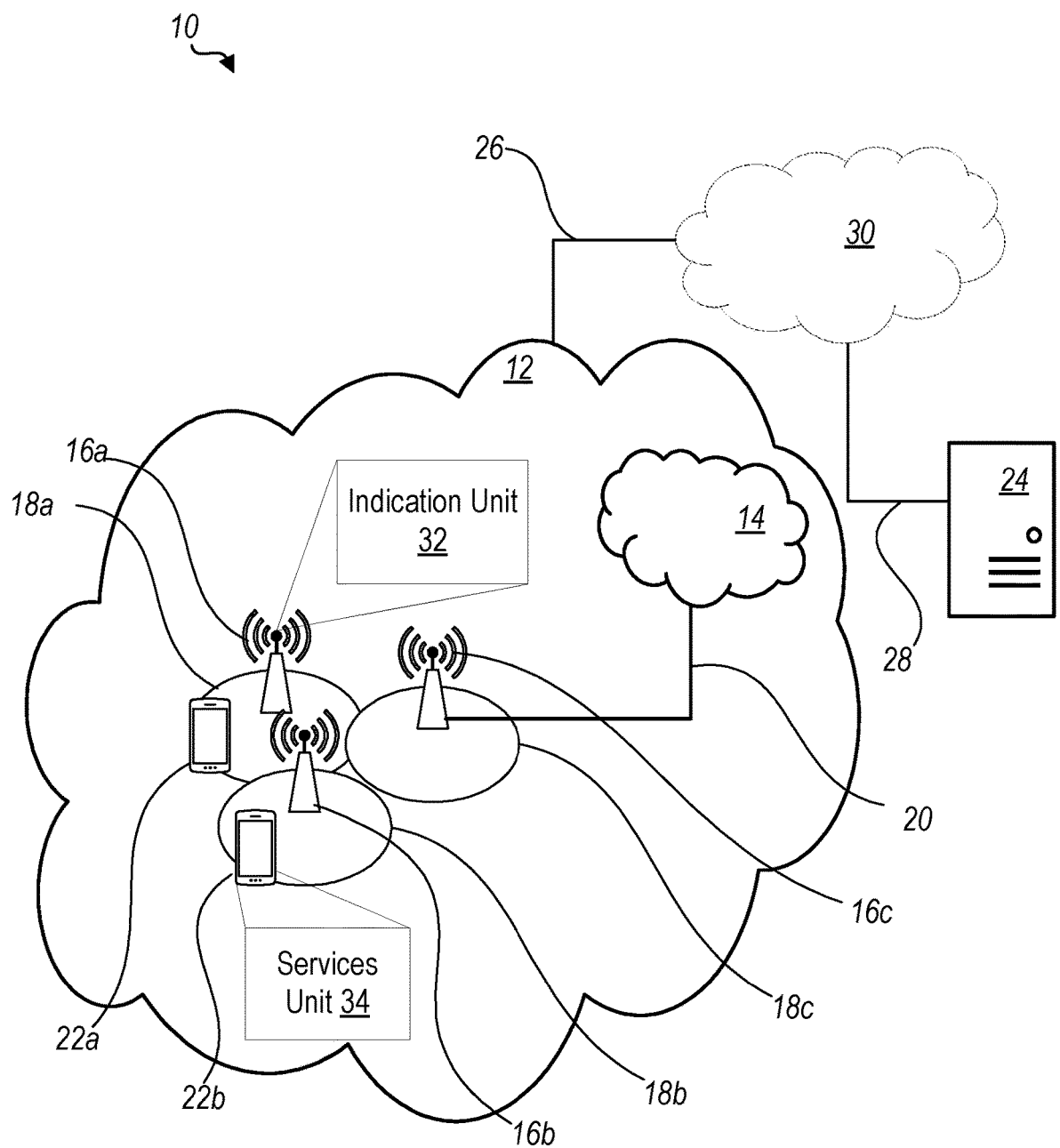
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24. A network node 16 is configured to include an indication unit 32, which is configured to indicate, in a System Information Block, SIB, whether a network supports an Internet Protocol, IP, Multimedia Subsystem, IMS, emergency communication service, the indication associated to a network identifier, the network identifier identifying the network.

In some embodiments, a network node 16 is configured to include indication unit 32, which is configured to, during at least one of a radio access network, RAN, setup and configuration, indicate whether the network node comprising the AMF supports emergency services.

In some embodiments, a network node 16 is configured to include indication unit 32, which is configured to request an emergency services fallback, the request including an indication of a network node supporting emergency services if a wireless device requests emergency services, the indication including at least one of a target Access Management Function, AMF, address and a target public land mobile network, PLMN, identity, ID.

In some embodiments, a network node 16 is configured to include indication unit 32, which is configured to, as a result of receiving a request for an emergency services fallback, send, to the wireless device, a radio resource control, RRC, release with redirect message including a public land mobile network, PLMN, identity, ID.

A wireless device 22 is configured to include a services unit 34, which is configured to receive, in a System Information Block, SIB, an indication of whether a network supports an Internet Protocol, IP, Multimedia Subsystem, IMS, emergency communication service, the indication associated to a network identifier, the network identifier identifying the network; and select a network to initiate an emergency communication service based at least in part on the received indication.

In some embodiments, a wireless device 22 is configured to include a services unit 34, which is configured to send a request for an emergency service; as a result of the request for the emergency service, receive a radio resource control, RRC, release with redirect message including a public land mobile network, PLMN, identity, ID; and use the PLMN ID to indicate a selected PLMN for an RRC establishment.

In some embodiments, a wireless device 22 is configured to include a services unit 34, which is configured to request, from the network node, an emergency service by indicating an emergency as one of a radio resource control, RRC, establishment cause and an RRC resume cause.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, determine, store, transmit, receive, relay, forward, etc., information related to indicating to and/or directing a wireless device to a network that supports emergency services.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to perform one or more network node functions described herein such as with respect to indicating to and/or directing a wireless device 22 to a network that supports emergency services.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a services unit 34 configured to perform one or more wireless device functions described herein such as with respect to indicating to and/or directing a wireless device to a network that supports emergency services.

Figure 3:
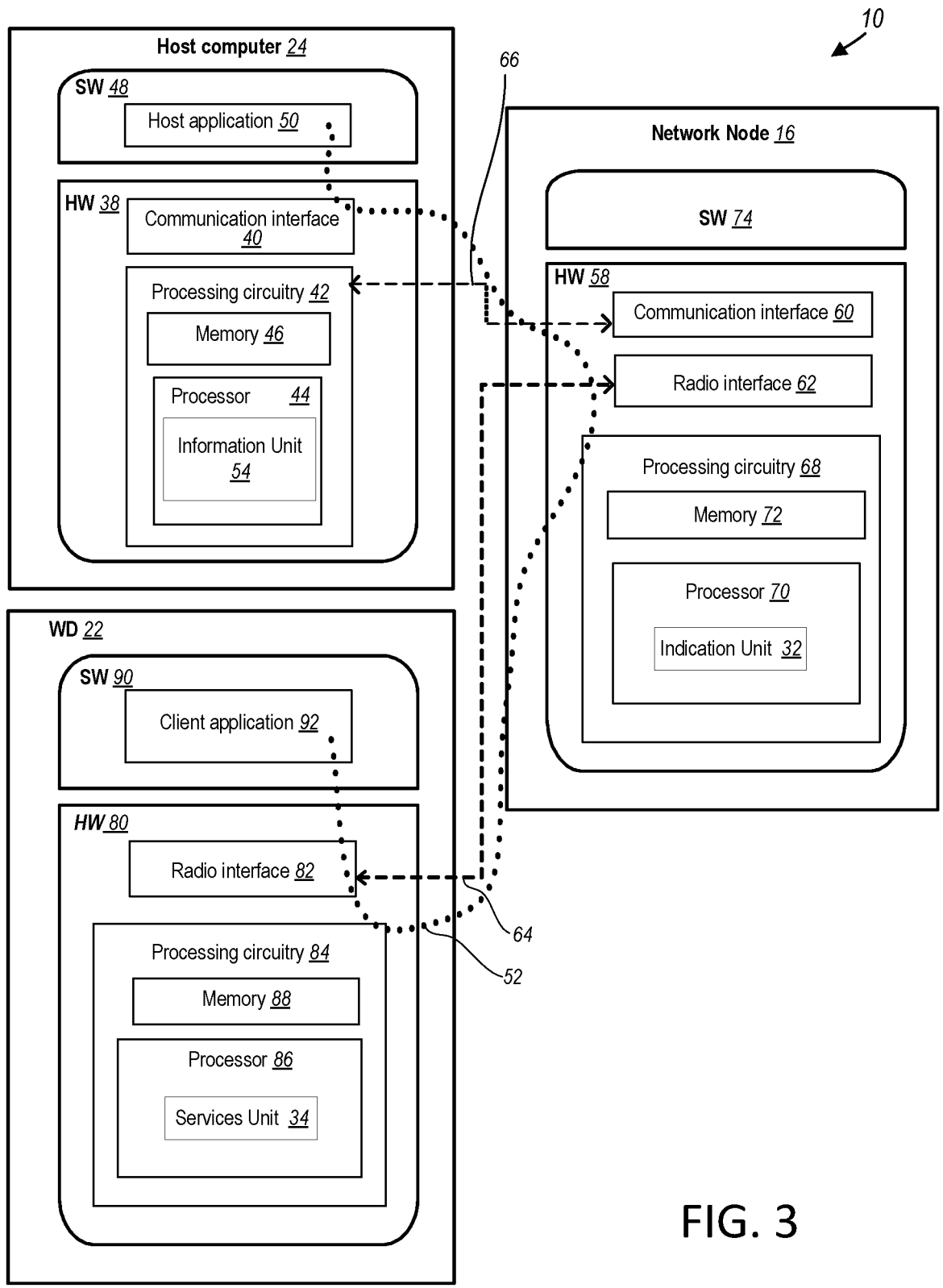
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular, empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as indication unit 32, and services unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
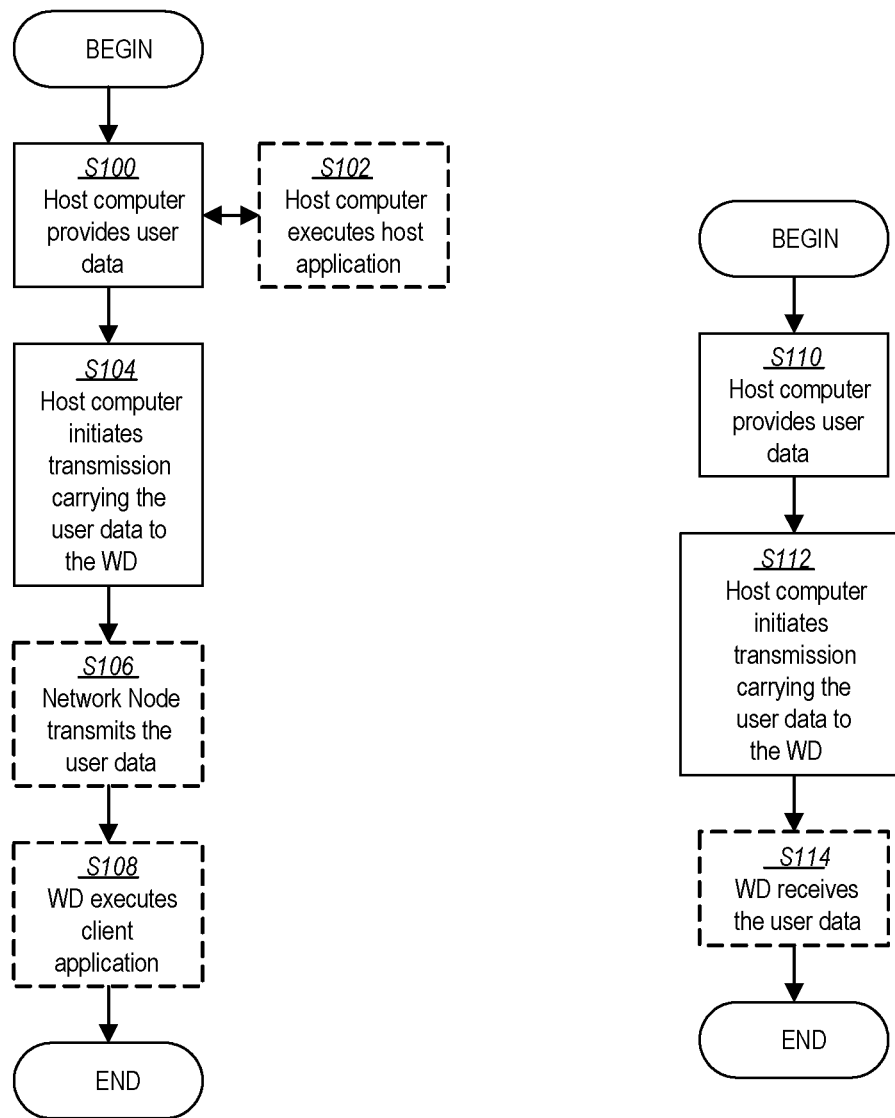
FIG. 4 is a flowchart illustrating exemplary methods implemented in a communication system including a host computer, a network node and a wireless device for executing a client application at a wireless device according to some embodiments of the present disclosure.
FIG. 5 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 6:
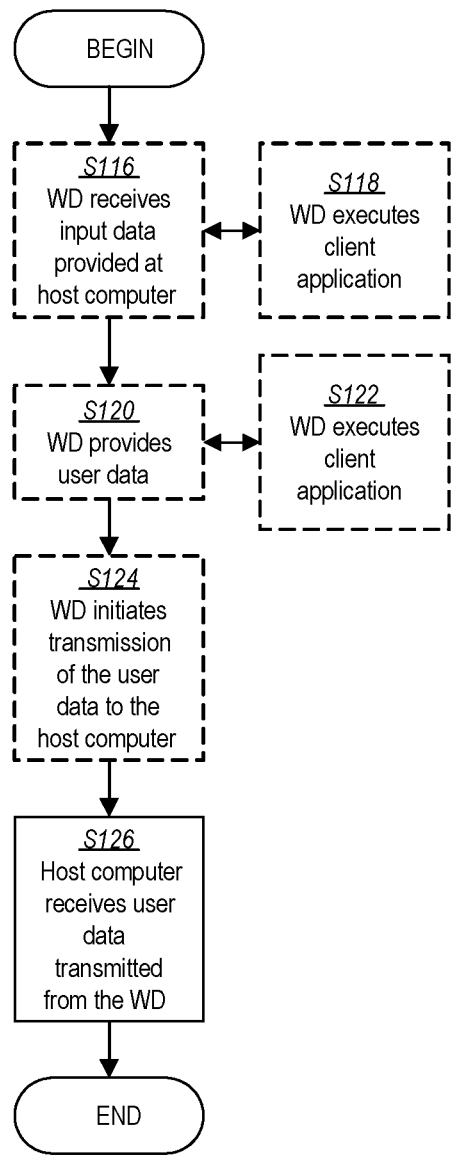
FIG. 6 is a flowchart illustrating exemplary methods implemented in a communication system including a host computer, a network node and a wireless device for receiving user data from the wireless device at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
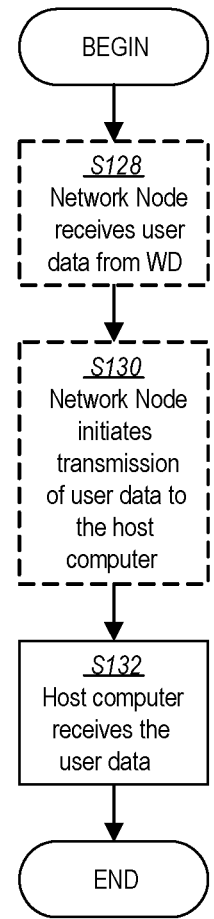
FIG. 7 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
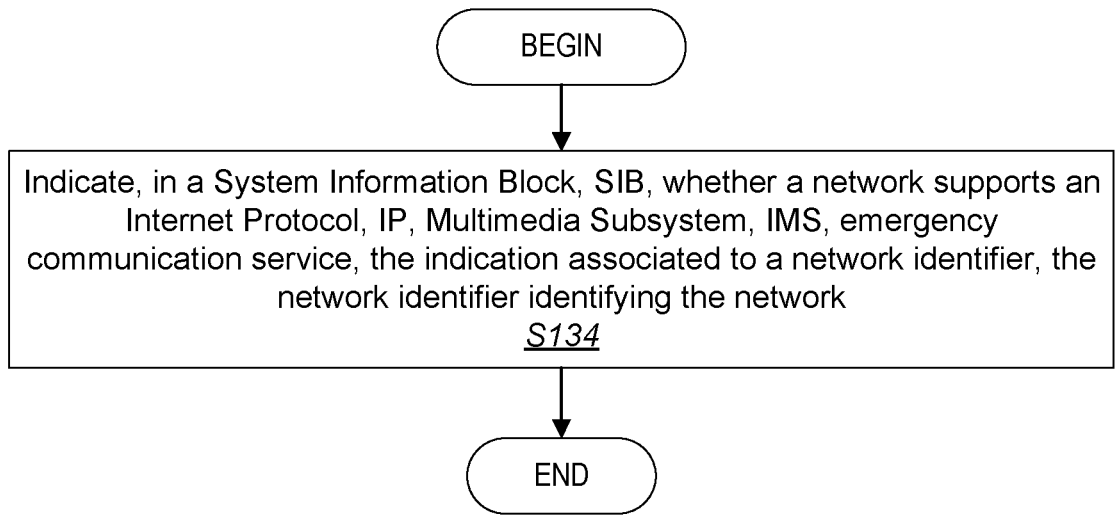
FIG. 8 is a flowchart of an exemplary process in a network node according to some embodiments of the present disclosure.

FIG. 8 is a flowchart of an exemplary process in a network node 16 according to some embodiments of the present disclosure. One or more Blocks and/or functions performed by network node 16 may be performed by one or more elements of network node 16 such as by indication unit 32 in processing circuitry 68, processor 70, communication interface 60, radio interface 62, etc. In one or more embodiments, network node 16 such as via one or more of processing circuitry 68, processor 70, communication interface 60 and/or radio interface 62 is configured to indicate (Block S134), in a System Information Block, SIB, whether a network supports an Internet Protocol, IP, Multimedia Subsystem, IMS, emergency communication service, the indication associated to a network identifier, the network identifier identifying the network.

In some embodiments, the indication is comprised in an ims-EmergencySupport SIB parameter. In some embodiments, the indication of whether the network supports the IMS emergency communication service is associated to a public land mobile network, PLMN, identity, ID. In some embodiments, the indication is further associated to a PLMN ID extension. In some embodiments, the PLMN ID extension is a network identity, NID, and a combination of the PLMN ID and the NID identifies a standalone non-public network, SNPN, to which the indication of whether the network supports the IMS emergency communication service is associated to. In some embodiments, the PLMN ID extension is a closed access group, CAG, identity, ID, and a combination of the PLMN ID and the CAG ID identifies a public network integrated, PNI, non-public network, NPN, to which the indication of whether the network supports the IMS emergency communication service is associated to.

Figure 9:
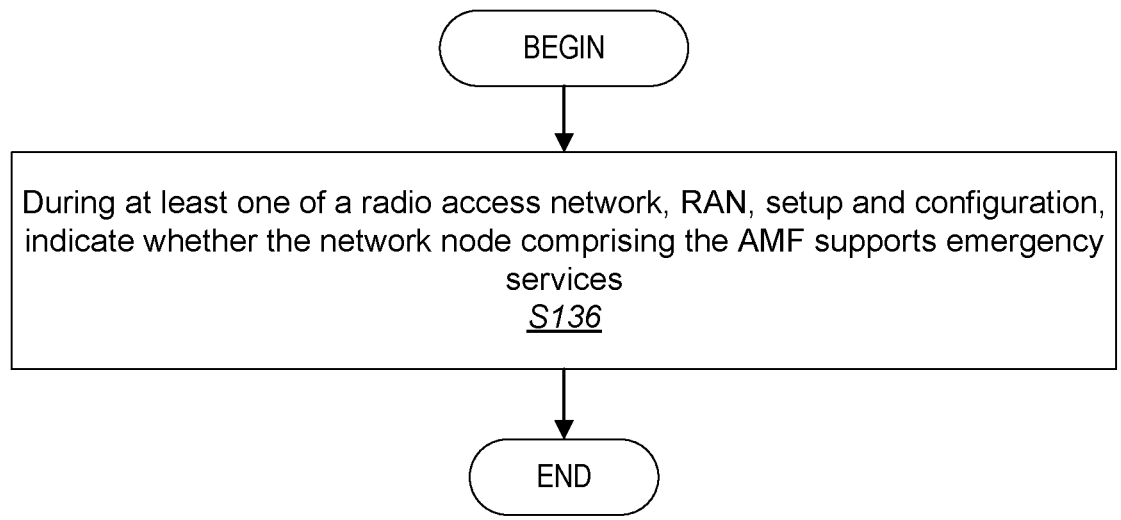
FIG. 9 is a flowchart of an exemplary process in a network node according to some embodiments of the present disclosure.

FIG. 9 is a flowchart of an exemplary process in a network node 16 according to some embodiments of the present disclosure. One or more Blocks and/or functions performed by network node 16 may be performed by one or more elements of network node 16 such as by indication unit 32 in processing circuitry 68, processor 70, communication interface 60, radio interface 62, etc. In one or more embodiments, network node 16 comprising an Access Management Function (AMF) such as via one or more of processing circuitry 68, processor 70, communication interface 60 and/or radio interface 62 is configured to during at least one of a radio access network, RAN, setup and configuration, indicate (Block S136) whether the network node 16 comprising the AMF supports emergency services.

Figure 10:
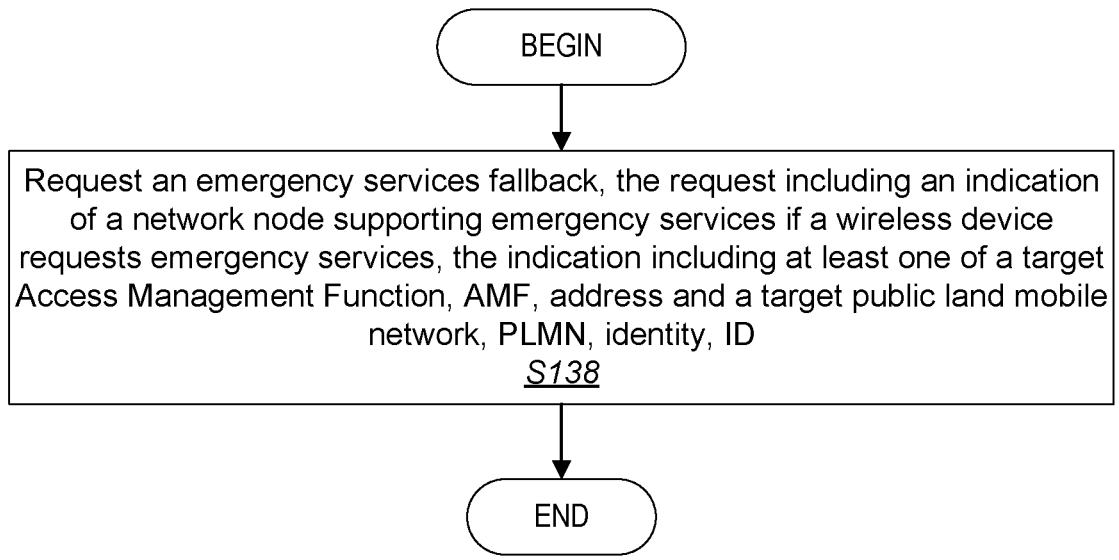
FIG. 10 is a flowchart of an exemplary process in a network node according to some embodiments of the present disclosure.
Figure 11:
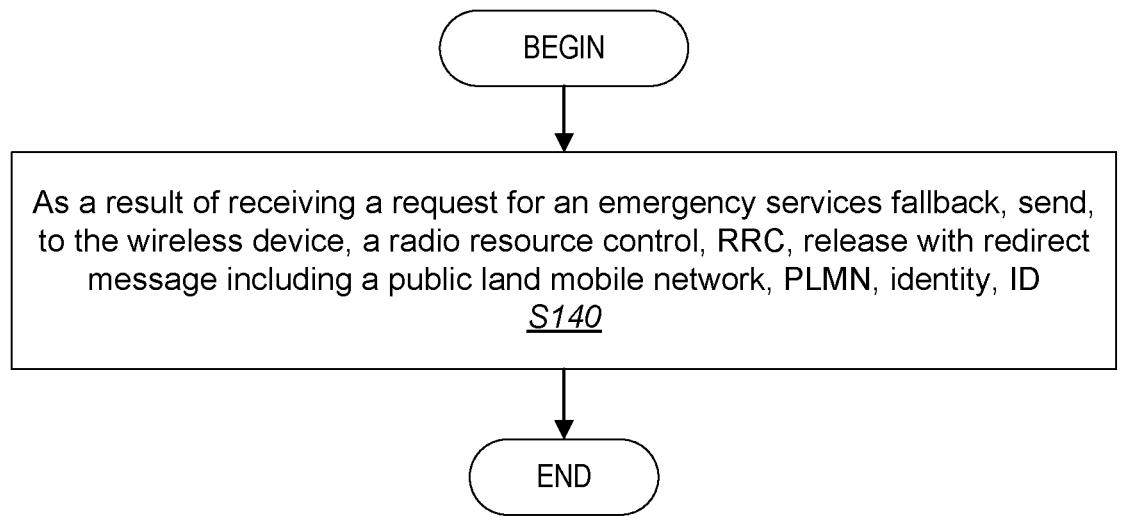
FIG. 11 is a flowchart of an exemplary process in a network node according to some embodiments of the present disclosure.

FIG. 10 is a flowchart of an exemplary process in a network node 16 according to some embodiments of the present disclosure. One or more Blocks and/or functions performed by network node 16 may be performed by one or more elements of network node 16 such as by indication unit 32 in processing circuitry 68, processor 70, communication interface 60, radio interface 62, etc. In one or more embodiments, network node 16 such as via one or more of processing circuitry 68, processor 70, communication interface 60 and/or radio interface 62 is configured to request (Block S138) an emergency services fallback, the request including an indication of a network node supporting emergency services if a wireless device 22 requests emergency services, the indication including at least one of a target Access Management Function, AMF, address and a target public land mobile network, PLMN, identity, ID FIG. 11 is a flowchart of an exemplary process in a network node 16 according to some embodiments of the present disclosure. One or more Blocks and/or functions performed by network node 16 may be performed by one or more elements of network node 16 such as by indication unit 32 in processing circuitry 68, processor 70, communication interface 60, radio interface 62, etc. In one or more embodiments, network node 16 such as via one or more of processing circuitry 68, processor 70, communication interface 60 and/or radio interface 62 is configured to, as a result of receiving a request for an emergency services fallback, send, to the wireless device 22, a radio resource control, RRC, release (Block S140) with redirect message including a public land mobile network, PLMN, identity, ID.

In one or more embodiments, network node 16 such as via one or more of processing circuitry 68, processor 70, communication interface 60 and radio interface 62 is configured to indicate a network node 16 supporting emergency services if the wireless device 22 requests emergency services.

In one or more embodiments, the indication includes a target Access Management Function (AMF) address. In one or more embodiments, the indication indicates whether emergency fallback to another emergency service is supported.

Figure 12:
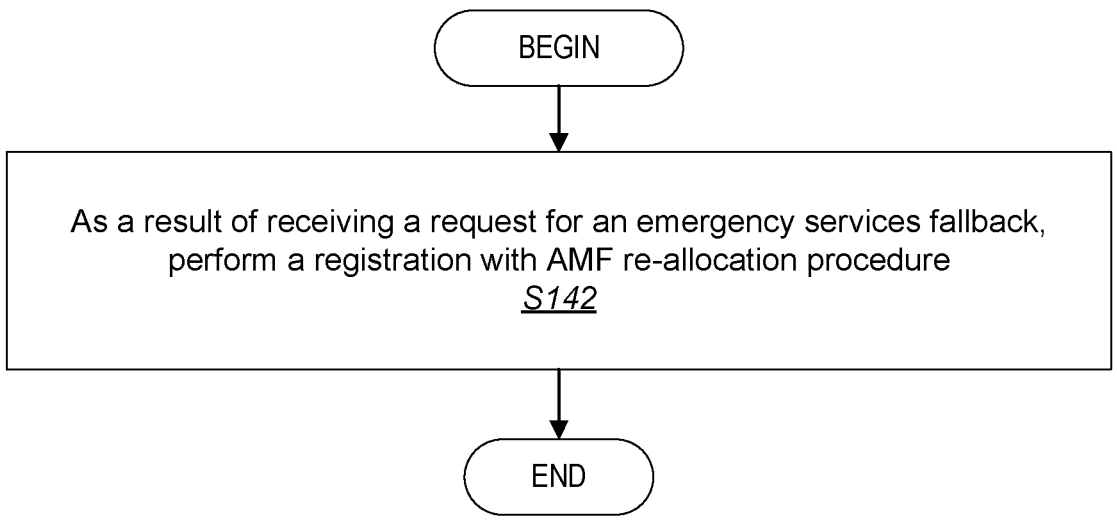
FIG. 12 is a flowchart of yet another example process in a network node according to some embodiments of the present disclosure.

FIG. 12 is a flowchart of an exemplary process in a network node 16 according to some embodiments of the present disclosure. One or more Blocks and/or functions performed by network node 16 may be performed by one or more elements of network node 16 such as by indication unit 32 in processing circuitry 68, processor 70, communication interface 60, radio interface 62, etc. In one or more embodiments, network node 16 comprising an Access Management Function (AMF) such as via one or more of processing circuitry 68, processor 70, communication interface 60 and/or radio interface 62 is configured to, as a result of receiving a request for an emergency services fallback, perform (Block S142) a registration with AMF re-allocation procedure.

In some embodiments, the processing circuitry 68, processor 70, communication interface 60 and/or radio interface 62 is configured to perform the registration with AMF re-allocation procedure by being configured to cause the network node 16 to perform the registration with AMF re-allocation procedure toward a target AMF, the target AMF being configured to support the request for the emergency services fallback.

Figure 13:
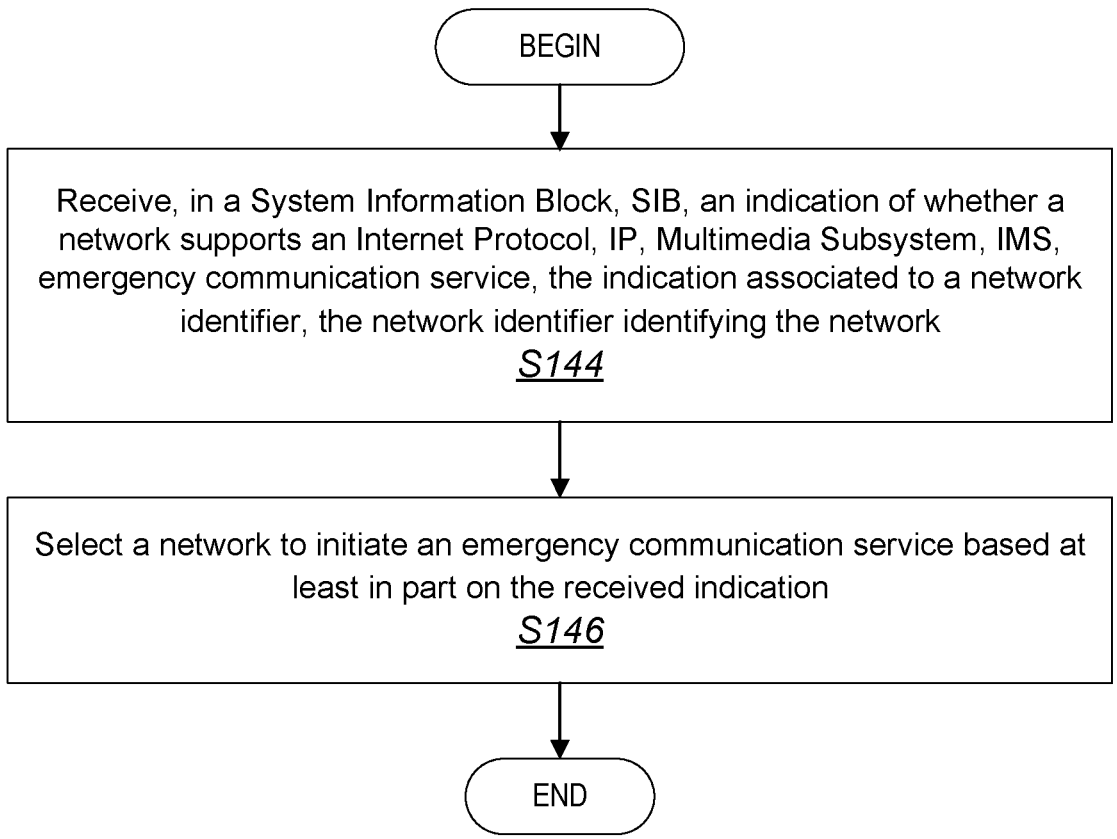
FIG. 13 is a flowchart of an exemplary process in a wireless device according to some embodiments of the present disclosure.

FIG. 13 is a flowchart of an exemplary process in a wireless device 22 according to some embodiments of the present disclosure. One or more Blocks and/or functions performed by wireless device 22 may be performed by one or more elements of wireless device 22 such as by services unit 34 in processing circuitry 84, processor 86, radio interface 82, etc. In one or more embodiments, wireless device 22 such as via one or more of processing circuitry 84, processor 86 and radio interface 82 is configured to receive (Block S144), in a System Information Block, SIB, an indication of whether a network supports an Internet Protocol, IP, Multimedia Subsystem, IMS, emergency communication service, the indication associated to a network identifier, the network identifier identifying the network. Wireless device 22 such as via one or more of processing circuitry 84, processor 86 and radio interface 82 is configured to select (Block S146) a network to initiate an emergency communication service based at least in part on the received indication.

In some embodiments, the indication is comprised in an ims-EmergencySupport SIB parameter. In some embodiments, the indication of whether the network supports the IMS emergency communication service is associated to a public land mobile network, PLMN, identity, ID. In some embodiments, the indication is further associated to a PLMN ID extension. In some embodiments, the PLMN ID extension is a network identity, NID, and a combination of the PLMN ID and the NID identifies a standalone non-public network, SNPN, to which the indication of whether the network supports the IMS emergency communication service is associated to. In some embodiments, the PLMN ID extension is a closed access group, CAG, identity, ID, and a combination of the PLMN ID and the CAG ID identifies a public network integrated, PNI, non-public network, NPN, to which the indication of whether the network supports the IMS emergency communication service is associated to.

Figure 14:
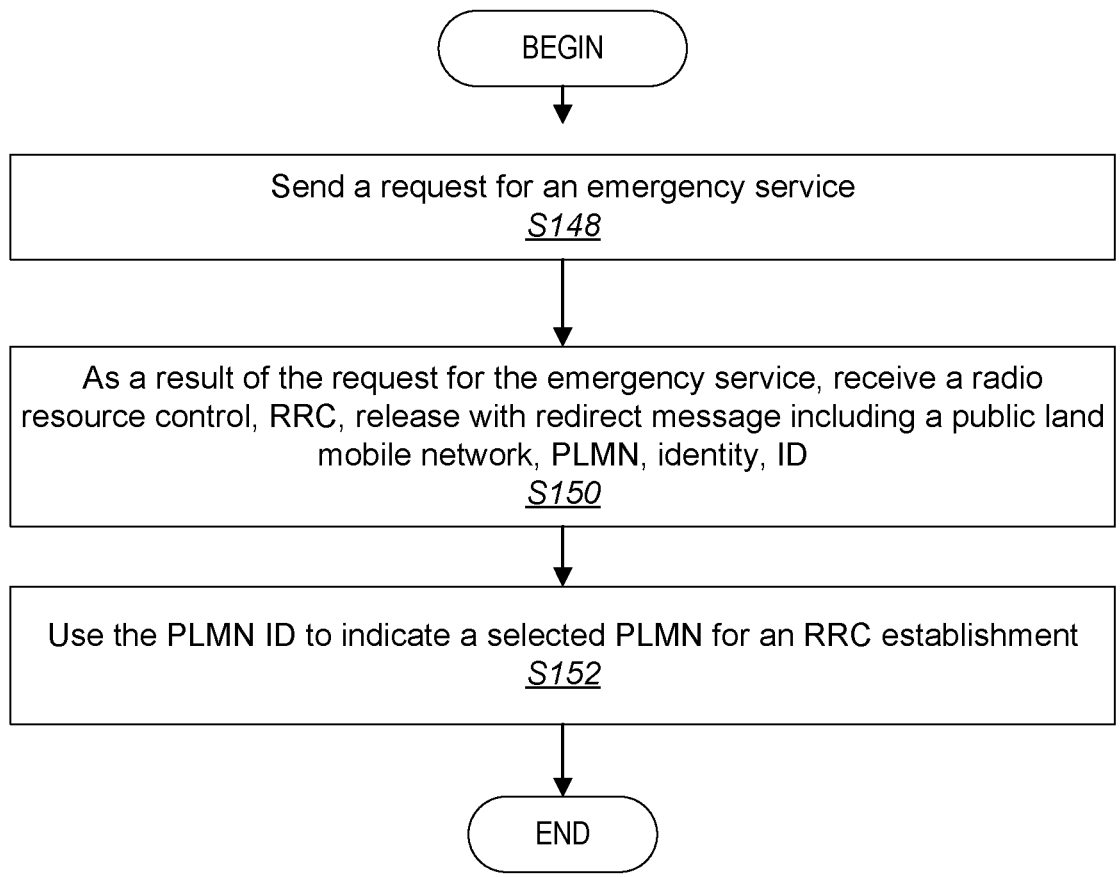
FIG. 14 is a flowchart of an exemplary process in a wireless device according to some embodiments of the present disclosure.

FIG. 14 is a flowchart of an exemplary process in a wireless device 22 according to some embodiments of the present disclosure. One or more Blocks and/or functions performed by wireless device 22 may be performed by one or more elements of wireless device 22 such as by services unit 34 in processing circuitry 84, processor 86, radio interface 82, etc. In one or more embodiments, wireless device 22 such as via one or more of processing circuitry 84, processor 86 and radio interface 82 is configured to send (Block S148) a request for an emergency service. Wireless device 22 such as via one or more of processing circuitry 84, processor 86 and radio interface 82 is configured to as a result of the request for the emergency service, receive a radio resource control, RRC, release (Block S150) with redirect message including a public land mobile network, PLMN, identity, ID. Wireless device 22 such as via one or more of processing circuitry 84, processor 86 and radio interface 82 is configured to use (Block S152) the PLMN ID to indicate a selected PLMN for an RRC establishment.

Figure 15:
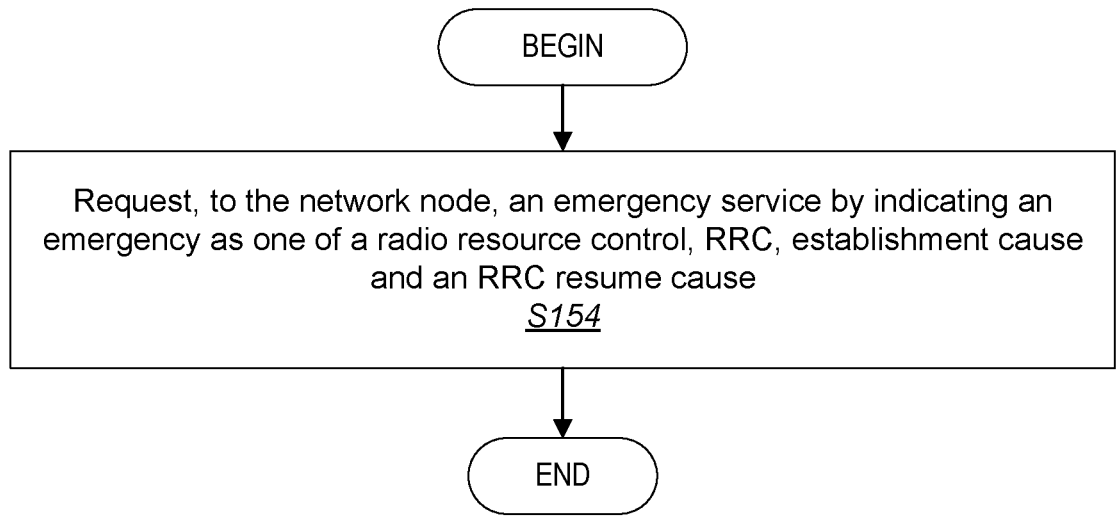
FIG. 15 is a flowchart of an exemplary process in a wireless device according to some embodiments of the present disclosure.

FIG. 15 is a flowchart of an exemplary process in a wireless device 22 according to some embodiments of the present disclosure. One or more Blocks and/or functions performed by wireless device 22 may be performed by one or more elements of wireless device 22 such as by services unit 34 in processing circuitry 84, processor 86, radio interface 82, etc. In one or more embodiments, wireless device 22 such as via one or more of processing circuitry 84, processor 86 and radio interface 82 is configured to request (Block S154), from the network node 16, an emergency service by indicating an emergency as one of a radio resource control, RRC, establishment cause and an RRC resume cause.

In one or more embodiments, wireless device 22 such as via one or more of processing circuitry 84, processor 86 and radio interface 82 is configured to receive an indication whether the network node 16 supports an emergency communication service. In one or more embodiments, wireless device such as via one or more of processing circuitry 84, processor 86 and radio interface 82 is configured to determine whether to initiate an emergency communication service with the network node 16 based at least in part on the indication.

In one or more embodiments, the indication includes a target Access Management Function (AMF) address. In one or more embodiments, the wireless device 22 is in at least one of a Radio Resource Control (RRC) idle state, limited service state and configuration management (CM) connected state.

Having generally described arrangements for indicating to and/or directing a wireless device to a network that supports emergency services, details for these arrangements, functions and processes are provided as follows, and which may be implemented by the network node 16, wireless device 22 and/or host computer 24.

Some embodiments provide indicating to and/or directing a wireless device to a network that supports emergency services.

In some embodiments, there may be multiple logical parts that may be used, and even if the one option would be to get the correct network/network node 16 selected from the wireless device 22 there may be enhancements in the network node 16 to redirect the wireless device 22 to a correct network node 16 in case the wireless device 22 does not select an appropriate network. The following embodiments include solution components which sometimes can be combined.

Wireless Device 22 in Limited Service, any Cell State

In some embodiments, e.g., if the wireless device 22 is in a limited service state, then the wireless device 22, via processing circuitry 84 and/or services unit 34, may initiate emergency service by indicating emergency as an establishment cause in the RRC to the network node 16, and as a selected PLMN, the wireless device 22, via processing circuitry 84 and/or services unit 34 and/or radio interface 82 may indicate the PLMN (i.e., public PLMN ID without indicating any PLMN ID extension, e.g., closed access group (CAG) Identifier (ID) or network identity (NID)).

Wireless Device 22 at RRC-IDLE, Selection of Network

In some embodiments, e.g., if the wireless device 22 is in RRC-IDLE, and the wireless device 22 may need to initiate emergency services via processing circuitry 84 and/or services unit 34, when selecting the network/network node 16 (e.g., using Selected PLMN and optionally extensions to the PLMN ID), the wireless device 22 instead of selecting the NPN (e.g., identified by PLMN ID and CAG Identifier or PLMN ID and NID) the wireless device 22, via processing circuitry 84 and/or services unit 34, selects a PLMN (i.e., a public network PLMN ID—Mobile Country Code/Mobile Network Code (MCC/MNC) allocated to a public operator) that is connected to the cell (i.e., first a PLMN for which the wireless device 22 has listed in the wireless device 22, e.g., in the operator controlled PLMN list and then any other public network PLMN ID).

Wireless Device 22 at RRC-IDLE, Considering Whether the Wireless Device 22 is Allowed Normal Services in the Cell In some embodiments, e.g., if the wireless device 22 is in RRC-IDLE, and the wireless device 22 may need to initiate emergency services, and the wireless device 22 is configured, by the network node 16 for example, with an Allowed CAG list, and the wireless device 22 may only be allowed to access CAG cells, the wireless device 22, using processing circuitry 84 and/or services unit 34, checks if the CAG Identifier in SIB is part of the Allowed CAG list by Non-Access Stratum (NAS) logic.

If that is the case (i.e., CAG identifier is part of allowed CAG list), and the wireless device 22 is Registration Managements (RM)-REGISTERED and the network node 16 has indicated support for emergency services and/or emergency fallback, then the wireless device 22 initiates a Service Request indicating an emergency.

If that is the case, and the wireless device 22 is RM-REGISTERED and the network node 16 has not indicated support for emergency services nor support for emergency fallback, then the wireless device 22, via processing circuitry 84 and/or services unit 34, selects a cell with a public PLMN (e.g., existing cell) and initiates an Emergency Registration using the PLMN ID as the selected PLMN and emergency as establishment cause.

Wireless Device 22 at CM-CONNECTED State—Wireless Device 22 Based Logic

In some embodiments, e.g., if the wireless device 22 is Connection Management (CM)-CONNECTED and configured with an Allowed CAG list, the wireless device 22, via processing circuitry 84 and/or services unit 34, may check if the CAG Identifier in SIB is part of the Allowed CAG list and, one or more of:

if CAG Identifier is part of the Allowed CAG list, the wireless device 22, via processing circuitry 84 and/or services unit 34, follows/implements existing procedures;

if the AMF indicated emergency is supported, then the wireless device 22, via processing circuitry 84 and/or services unit 34, initiates a protocol data unit (PDU) Session for emergency; and/or if CAG Identifier is not part of the Allowed CAG list, the wireless device 22 ignores the CAG restriction, moves to RRC-IDLE and initiates an Emergency Registration using the PLMN ID as the selected PLMN (i.e., public PLMN without indicating any CAG Identifier).

Wireless Device 22 at CM-CONNECTED State—Enhanced Fallback

Figure 16:
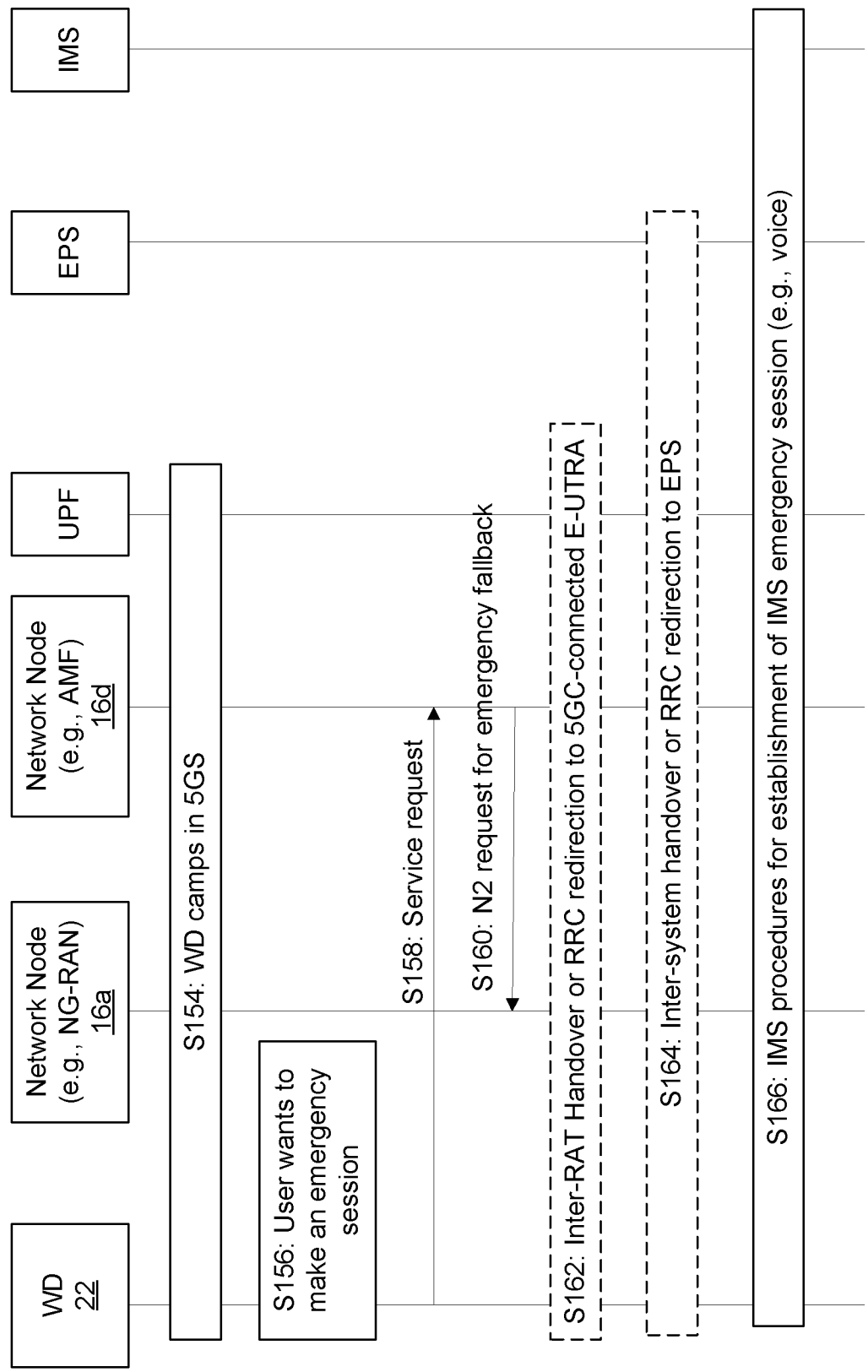
FIG. 16 is a signaling diagram of an emergency services fallback in accordance with the principles of the disclosure.

In some embodiments, e.g., if the wireless device 22 is CM-CONNECTED and determines, via processing circuitry 84 and/or services unit 34, to initiate an emergency service (e.g., initiate PDU Session for emergency), then procedures shown in FIG. 16 allow a fallback to EPS or to E-UTRA from NR. However, currently, such procedure may not allow a redirection to another network, e.g., from NPN to PLMN (with or without a change of network id).

An example of a procedure, such as shown in FIG. 16, which may allow for redirection to or selection of a network supporting emergency services according to some embodiments of the present disclosure is described below, and which may include one or more of the following steps.

S154: The WD 22 camps on E-UTRA or a NR cell in the 5GS (in either CM_IDLE or CM_CONNECTED state).

S156: The user may want to make an emergency session and the WD 22 may have a pending IMS emergency session request (e.g., voice) from the upper layers.

S158: If the AMF (e.g., network node 16d) has indicated support for emergency services using fallback via the Registration Accept message for the current RAT, the WD 22, via radio interface 82, sends a Service Request message indicating that it requires emergency services fallback.

S160: 5GC triggers a N2 request for Emergency Services Fallback by executing a Next Generation-Application Protocol (NG-AP) procedure in which 5GC indicates to NG-RAN (e.g., network node 16a) that this is a fallback for emergency services. The AMF (e.g., network node 16d) based on the support of Emergency Services in EPC or 5GC may indicate the target core network (CN) for the RAN node to know whether inter-RAT fallback or inter-system fallback is to be performed. The AMF (e.g., network node 16d) may instead or in addition indicate a target AMF address, e.g., AMF Set/GUAMI (Globally Unique AMF identifier) (in case the same serving PLMN ID) or target CN PLMN ID (in case of a shared NG-RAN and the AMF is configured with PLMN ID to use for emergency services). As one non-limiting example, some embodiments may provide for the NG-RAN (e.g., network node 16a) to trigger a handover or redirection still within NR but to a different PLMN by e.g., indicating the target CN PLMN ID. When AMF (e.g., network node 16d) initiates Redirection for WD(s) 22 that have been successfully authenticated, AMF (e.g., network node 16*d*) includes the security context in the request to trigger fallback towards NG-RAN (e.g., network node 16*a*).

In one or more embodiments, for release with redirection (RwR), PLMN ID in the release message may be implemented. Wireless device 22 context may be retrieved by target 5GC if it is possible, otherwise there may be a need to create new wireless device 22 context and therefore the wireless device 22 may perform a Registration procedure when entering a new network after release with redirect (RwR) and if no relation and handover (HO) is performed then the network may trigger re-registration, wireless device 22 identity request or authentication, etc. in case the 5GC may lack information in the NAS or N2 message to create a WD 22 context.

Based on the target CN indicated in step S160 above, one of the following procedures may be executed by NG-RAN (e.g., network node 16*a*):

S162: NG-RAN (e.g., network node 16*a*) initiates handover or redirection to a 5GC-connected E-UTRAN cell (RRC Release with Redirect may include PLMN ID), if WD 22 is currently camped on NR.

S164: NG-RAN (e.g., network node 16*a*) initiates handover or redirection to E-UTRAN connected to EPS. NG-RAN (e.g., network node 16*a*) uses the security context provided by the AMF (e.g., network node 16*d*) to secure the redirection procedure.

If the redirection procedure used either in S162 or S164 above, the target CN is also conveyed to the wireless device 22 in order to be able to perform the appropriate NAS procedures (S1 or N1 Mode). The wireless device 22, via processing circuitry 84 and/or services unit 34, uses the emergency indication in the RRC message as specified in clause 6.2.2 of 3GPP Technical Specification (TS) 36.331 and E-UTRAN provides the emergency indication to AMF (e.g., network node 16*d*) in step S162 and MME in step S164 during Tracking Area Update (TAU). If the RRC Release with Redirect includes a PLMN ID, then the wireless device 22, via processing circuitry 84 and/or radio interface 82 and/or services unit 34, provides it as Selected PLMN in RRC establishment. For the handover procedure used in step S164, see clause 4.11.1.2.1, step 1 of 3GPP TS 36.331.

S166: After handover to the target cell, the wireless device 22, via processing circuitry 84, establishes a PDU Session/PDN (Packet Data Network) connection for IMS emergency services and performs the IMS procedures for establishment of an IMS emergency session (e.g., voice) as defined in one or more wireless communication standards such as in 3GPP TS 23.167.

SIB Enhancements

In some embodiments, the System Information, SIB, could separate the "ims-EmergencySupport" per PLMN (per network identity/identifier) and the wireless device 22, via processing circuitry 84, can decide network identity, e.g., PLMN (with or without PLMN ID extensions, NID or CAG ID) based on the indicated support. The PLMN ID and PLMN ID extensions identify a network (e.g., a combination of the PLMN ID and NID identifies a SNPN, a combination of the PLMN ID and CAG ID identifies a PNI NPN, etc.). Stated another way, a per-network emergency support indication may be provided (e.g., sent by network node 16 to WD 22) via the "ims-EmergencySupport" SIB parameter.

Currently, in SIB1 the information indicating whether emergency is supported, "ims-EmergencySupport" parameter, is not indicated per network/Cell Identity (ID); in other words, the same indication is used for all networks/cell IDs sharing the same physical cell. Thus, some embodiments of the present disclosure may provide for extending the SIB1 indication to be set per network/cell ID.

NG-RAN Enhancements

The NG-RAN, i.e., network node 16*a*, can be enhanced to use the Establishment cause or Resume cause "emergency" as to decide to select a NAS Node (5GC) supporting IMS Emergency.

In some embodiments, N2/NG Setup and Configuration can be enhanced to allow AMF (e.g., network node 16*d*) to indicate support for emergency services 5GC Enhancements of AMF Re-Allocation In some embodiments, 5GC may be enhanced to allow an AMF (e.g., network node 16*d*) re-allocation between PLMNs (e.g., between two networks using different PLMN ID or PLMN and NID or PLMN and CAG Identifier), based on a Service Request (e.g., from WD 22 and/or NG-RAN) indicating that it requires emergency services fallback.

The AMF (e.g., network node 16*d*) re-allocation can follow principles described in existing wireless communication standards such as in 3GPP Technical Specification (TS) 23.502 clause "4.2.2.2.3 Registration with AMF re-allocation", incorporated herein by reference, with steps 6a to 8 as basis i.e., without Network Slice selection and authentication, etc., on source side as already done.

In one or more embodiments, 5GC at a target node may trigger the procedure towards the wireless device 22 to be able to create a new wireless device 22 context.

Therefore, in one or more embodiments, the system, i.e., network node 16, is able to direct the wireless device 22 to the network node 16 supporting emergency services when the wireless device 22 requests emergency services.

Some embodiments may include one or more of the following:

Embodiment A1. A network node configured to communicate with a wireless device (WD), the network node configured to, and/or comprising a radio interface and/or comprising processing circuitry configured to:

indicate a network node supporting emergency services if the wireless device requests emergency services.

Embodiment A2. The network node of Embodiment A1, wherein the indication includes a target Access Management Function (AMF) address.

Embodiment A3. The network node of Embodiment A1, wherein the indication indicates whether emergency fallback to another emergency service is supported.

Embodiment B1. A method implemented in a network node, the method comprising indicating a network node supporting emergency services if the wireless device requests emergency services.

Embodiment B2. The method of Embodiment B1, wherein the indication includes a target Access Management Function (AMF) address.

Embodiment B3. The method of Embodiment B1, wherein the indication indicates whether emergency fallback to another emergency service is supported.

Embodiment C1. A wireless device (WD) configured to communicate with a network node, the WD configured to, and/or comprising a radio interface and/or processing circuitry configured to:

receive an indication whether the network node supports an emergency communication service; and determine whether to initiate an emergency communication service with the network node based at least in part on the indication.

Embodiment C2. The WD of Embodiment C1, wherein the indication includes a target Access Management Function (AMF) address.

Embodiment C3. The WD of Embodiment C1, wherein the wireless device is in one of a Radio Resource Control (RRC) idle state, limited service state and configuration management (CM) connected state.

Embodiment D1. A method implemented in a wireless device (WD), the method comprising:
receiving an indication whether the network node supports an emergency communication service; and
determining whether to initiate an emergency communication service with the network node based at least in part on the indication.

Embodiment D2. The method of Embodiment D1, wherein the indication includes a target Access Management Function (AMF) address.

Embodiment D3. The method of Embodiment D1, wherein the wireless device is in one of a Radio Resource Control (RRC) idle state, limited service state and configuration management (CM) connected state.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 5GS | 5G System |
| 5GC | 5G Core network |
| AMF | Access and Mobility Management Function |
| CAG | Closed Access Group |
| eNB | Evolved Node B |
| E-UTRAN | Evolved Universal Terrestrial Access Network |
| EPC | Evolved Packet Core network |
| gNB | 5G Node B |
| HO | Handover |
| LTE | Long-term Evolution |
| NID | Network Identifier |
| NG-RAN | Next Generation Radio Access Network |
| NR | New Radio |
| RA | Random Access |
| RRC | Radio Resource Control |
| UE | User Equipment |
| UPF | User Plane Function |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising processing circuitry, the processing circuitry configured to cause the network node to:
   transmit, in a System Information Block, SIB, a first indication indicating whether a non-public network, NPN, supports an Internet Protocol, IP, Multimedia Subsystem, IMS, emergency communication service, the first indication being associated to a public land mobile network, PLMN, identity, ID, extension, the PLMN ID extension corresponding to a PLMID and being a network identity, NID, a combination of the PLMN ID and the NID identifying a standalone NPN to which the first indication applies; and
   receive, from the wireless device, a second indication indicating a public network supporting the IP IMS emergency communication service to initiate the IP IMS emergency communication service, the public network being selected by the wireless device based at least in part on the first indication.

2. The network node of claim 1, wherein the first indication is comprised in an ims-EmergencySupport SIB parameter.

3. The network node of claim 1, wherein the first indication is associated to a PLMN, ID.

4. A wireless device configured to communicate with a network node, the wireless device comprising processing circuitry, the processing circuitry configured to cause the wireless device to:
   receive, in a System Information Block, SIB, a first indication indicating whether a non-public network, NPN, supports an Internet Protocol, IP, Multimedia Subsystem, IMS, emergency communication service, the first indication being associated to a public land mobile network, PLMN, identity, ID, extension, the PLMN ID extension corresponding to a PLMID and being a network identity, NID, a combination of the PLMN ID and the NID identifying a standalone NPN to which the first indication of applies;
   select a public network supporting the IP IMS emergency communication service to initiate the IP IMS emergency communication service based at least in part on the first indication; and
   transmit, to the network node, a second indication indicating the public network supporting the IP IMS emergency communication service.

5. The wireless device of claim 4, wherein the first indication is comprised in an ims-EmergencySupport SIB parameter.

6. The wireless device of claim 4, wherein the first indication is associated to a PLMN, ID.

* * * * *

UNITED STATES PATENT AND TRADEMARK OFFICE
CERTIFICATE OF CORRECTION

Page 1 of 3

PATENT NO. : 11,917,518 B2
APPLICATION NO. : 17/442218
DATED : February 27, 2024
INVENTOR(S) : Ohlsson et al.

It is certified that error appears in the above-identified patent and that said Letters Patent is hereby corrected as shown below:

On the Title Page

Item (56), under "OTHER PUBLICATIONS", in Column 2, Line 1, delete "23502" and insert -- 23.502 --, therefor.

On Page 2, Item (56), under "OTHER PUBLICATIONS", in Column 2, Line 19, delete "Bgpp Tsg-Sa" and insert -- 3GPP TSG-SA --, therefor.

In the Drawings

In Fig. 10, Sheet 7 of 10, for Tag "S138", Line 4, delete "Access Management Function," and insert -- Access and Mobility Management Function, --, therefor.

In the Specification

In Column 1, Line 44, delete "Access Management Function" and insert -- Access and Mobility Management Function --, therefor.

In Column 1, Line 65, delete "networks" and insert -- land mobile network --, therefor.

In Column 4, Lines 2-3, delete "Access Management Function," and insert -- Access and Mobility Management Function, --, therefor.

In Column 4, Line 8, delete "Access Management Function," and insert -- Access and Mobility Management Function, --, therefor.

In Column 4, Line 22, delete "Access Management Function," and insert -- Access and Mobility Management Function, --, therefor.

Signed and Sealed this
Seventeenth Day of September, 2024

Katherine Kelly Vidal
*Director of the United States Patent and Trademark Office*

In Column 4, Line 31, delete "Access Management Function," and insert -- Access and Mobility Management Function, --, therefor.

In Column 5, Line 21, delete "Access Management Function," and insert -- Access and Mobility Management Function, --, therefor.

In Column 5, Line 31, delete "Access Management Function," and insert -- Access and Mobility Management Function, --, therefor.

In Column 7, Line 29, delete "access management function" and insert -- access and mobility management function --, therefor.

In Column 7, Line 49, delete "equipped" and insert -- equipment --, therefor.

In Column 7, Line 52, delete "(NB-IOT)" and insert -- (NB-IoT) --, therefor.

In Column 7, Line 66, delete "Wide Band" and insert -- Wideband --, therefor.

In Column 10, Lines 26-27, delete "Access Management Function," and insert -- Access and Mobility Management Function, --, therefor.

In Column 11, Line 6, delete "Circuitry)" and insert -- Circuits) --, therefor.

In Column 12, Line 14, delete "Circuitry)" and insert -- Circuits) --, therefor.

In Column 12, Line 60, delete "Circuitry)" and insert -- Circuits) --, therefor.

In Column 16, Lines 45-46, delete "Access Management Function" and insert -- Access and Mobility Management Function --, therefor.

In Column 16, Lines 65-66, delete "Access Management Function," and insert -- Access and Mobility Management Function, --, therefor.

In Column 17, Line 21, delete "Access Management Function" and insert -- Access and Mobility Management Function --, therefor.

In Column 17, Lines 32-33, delete "Access Management Function" and insert -- Access and Mobility Management Function --, therefor.

In Column 18, Line 59, delete "Access Management Function" and insert -- Access and Mobility Management Function --, therefor.

In Column 22, Lines 41-42, delete "Access Management Function" and insert -- Access and Mobility Management Function --, therefor.

In Column 22, Lines 51-52, delete "Access Management Function" and insert -- Access and Mobility Management Function --, therefor.

In Column 22, Lines 66-67, delete "Access Management Function" and insert -- Access and Mobility Management Function --, therefor.

In Column 23, Lines 14-15, delete "Access Management Function" and insert -- Access and Mobility Management Function --, therefor.

In Column 24, Line 48, delete "5GC" and insert -- 5GCN --, therefor.

In Column 24, Line 52, delete "Access" and insert -- Radio Access --, therefor.

In Column 24, Line 53, delete "Core network" and insert -- Core --, therefor.

In the Claims

In Column 26, Line 14, in Claim 4, delete "indication of" and insert -- indication --, therefor.